United States Patent
Desai et al.

(10) Patent No.: US 12,242,241 B2
(45) Date of Patent: Mar. 4, 2025

(54) METHOD AND APPARATUS FOR DESIGNING AND MANUFACTURING A COMPONENT IN A COMPUTER-AIDED DESIGN AND MANUFACTURING ENVIRONMENT

(71) Applicant: Siemens Industry Software Inc., Plano, TX (US)

(72) Inventors: Devansh Desai, Maharashtra (IN); Omar Fergani, Berlin (DE); Vinit Shukla, Maharashtra (IN); Matthias Gebauer, Kassel (DE)

(73) Assignee: Siemens Industry Software Inc., Plano, TX (US)

( * ) Notice: Subject to any disclaimer, the term of this patent is extended or adjusted under 35 U.S.C. 154(b) by 341 days.

(21) Appl. No.: 17/784,619

(22) PCT Filed: Jul. 31, 2020

(86) PCT No.: PCT/US2020/044387
§ 371 (c)(1),
(2) Date: Jun. 10, 2022

(87) PCT Pub. No.: WO2021/118649
PCT Pub. Date: Jun. 17, 2021

(65) Prior Publication Data
US 2023/0008167 A1    Jan. 12, 2023

(30) Foreign Application Priority Data
Dec. 13, 2019    (IN) .............................. 201931051841

(51) Int. Cl.
*G05B 19/4099*    (2006.01)
*B22F 10/80*    (2021.01)
(Continued)

(52) U.S. Cl.
CPC .......... *G05B 19/4099* (2013.01); *B22F 10/80* (2021.01); *B33Y 50/00* (2014.12);
(Continued)

(58) Field of Classification Search
CPC ....................................................... B33Y 50/00
(Continued)

(56) References Cited

U.S. PATENT DOCUMENTS

2017/0368754 A1    12/2017    Fruth et al.
2018/0117850 A1    5/2018    Schwartz et al.
(Continued)

FOREIGN PATENT DOCUMENTS

CN        108885643 A      11/2018
WO    2019209327 A1      10/2019

OTHER PUBLICATIONS

International Search Report and Written Opinion for International App No. PCT/US2020/044387 mailed Oct. 21, 2020.
(Continued)

*Primary Examiner* — Jigneshkumar C Patel
(74) *Attorney, Agent, or Firm* — Lempia Summerfield Katz LLC

(57) ABSTRACT

A method and apparatus for designing and manufacturing a component in a computer-aided design and manufacturing environment is disclosed. A method includes obtaining a geometric model of a component from a geometric model database, and determining at least one orientation parameter value associated with the geometric model of the component. The at least one orientation parameter value is associated with an orientation parameter that defines orientation of the component during additive manufacturing of the component. The method includes performing volumetric analysis of the component based on the at least one orientation parameter value associated with the component using
(Continued)

the geometric model of the component. The method also includes computing one or more overheating areas in the component corresponding to the at least one orientation parameter value based on the volumetric analysis of the geometric model of the component, and outputting a multi-dimensional visual representation of the geometric model of the component Indicating one or more overheating areas in the component.

9 Claims, 11 Drawing Sheets

(51) Int. Cl.
*B33Y 50/00* (2015.01)
*B22F 10/28* (2021.01)
(52) U.S. Cl.
CPC .... *B22F 10/28* (2021.01); *G05B 2219/35134* (2013.01); *G05B 2219/49023* (2013.01)

(58) Field of Classification Search
USPC .......................................................... 700/98
See application file for complete search history.

(56) References Cited

U.S. PATENT DOCUMENTS

2019/0030791 A1* 1/2019 Reznik ................. B29C 64/153
2020/0198010 A1* 6/2020 Edelhäuser ............ B22F 12/13

OTHER PUBLICATIONS

Mohanty, Sankhya, and Jesper Henri Hattel. "Reducing residual stresses and deformations in selective laser melting through multi-level multi-scale optimization of cellular scanning strategy." Laser 3D Manufacturing III. vol. 9738. SPIE, 2016.

Ranjan, Rajit, et al. "Controlling local overheating in topology optimization for additive manufacturing." Proceedings of euspen special interest group meeting: additive manufacturing, Leuven, Belgium. 2017.

* cited by examiner

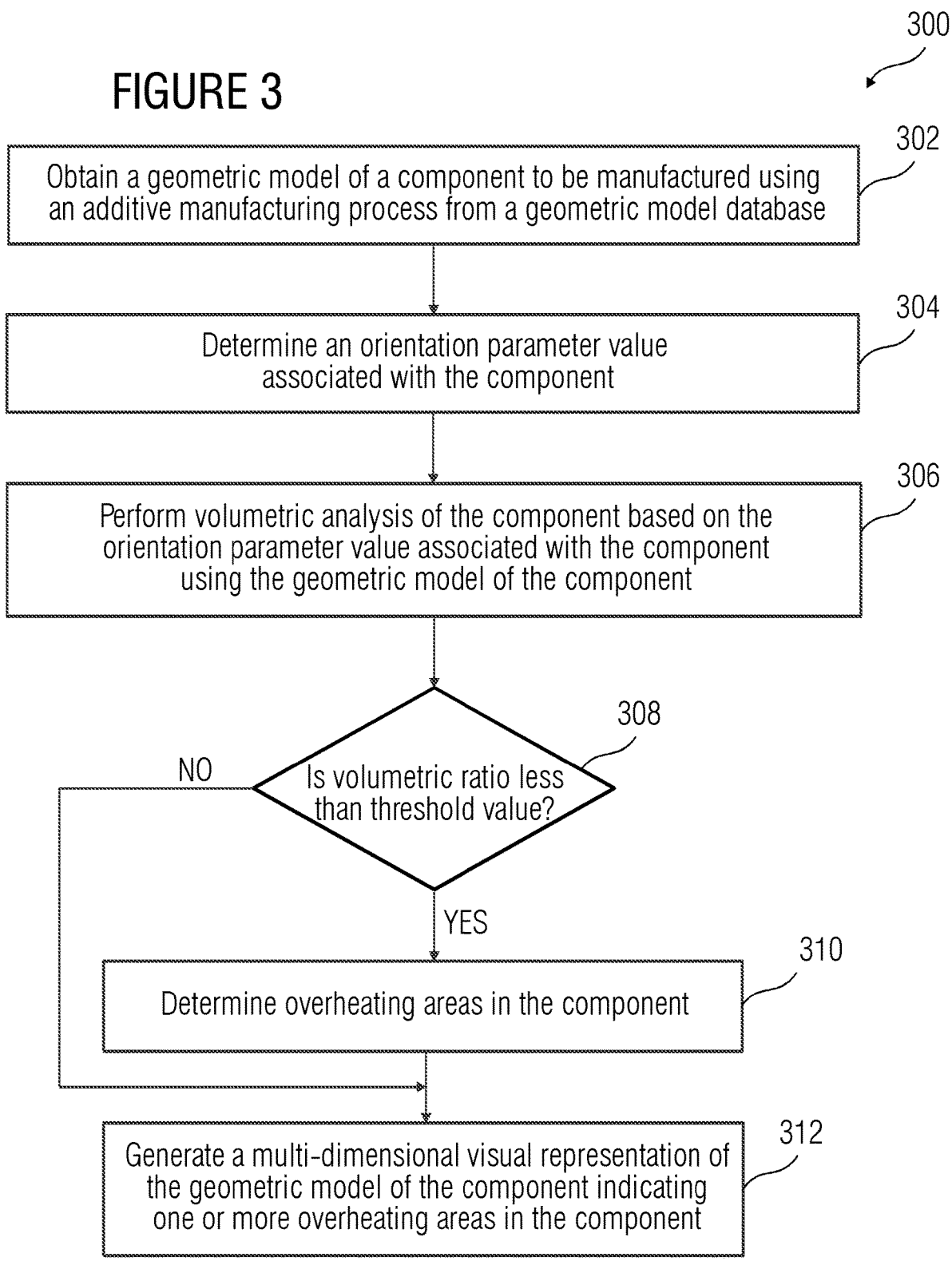

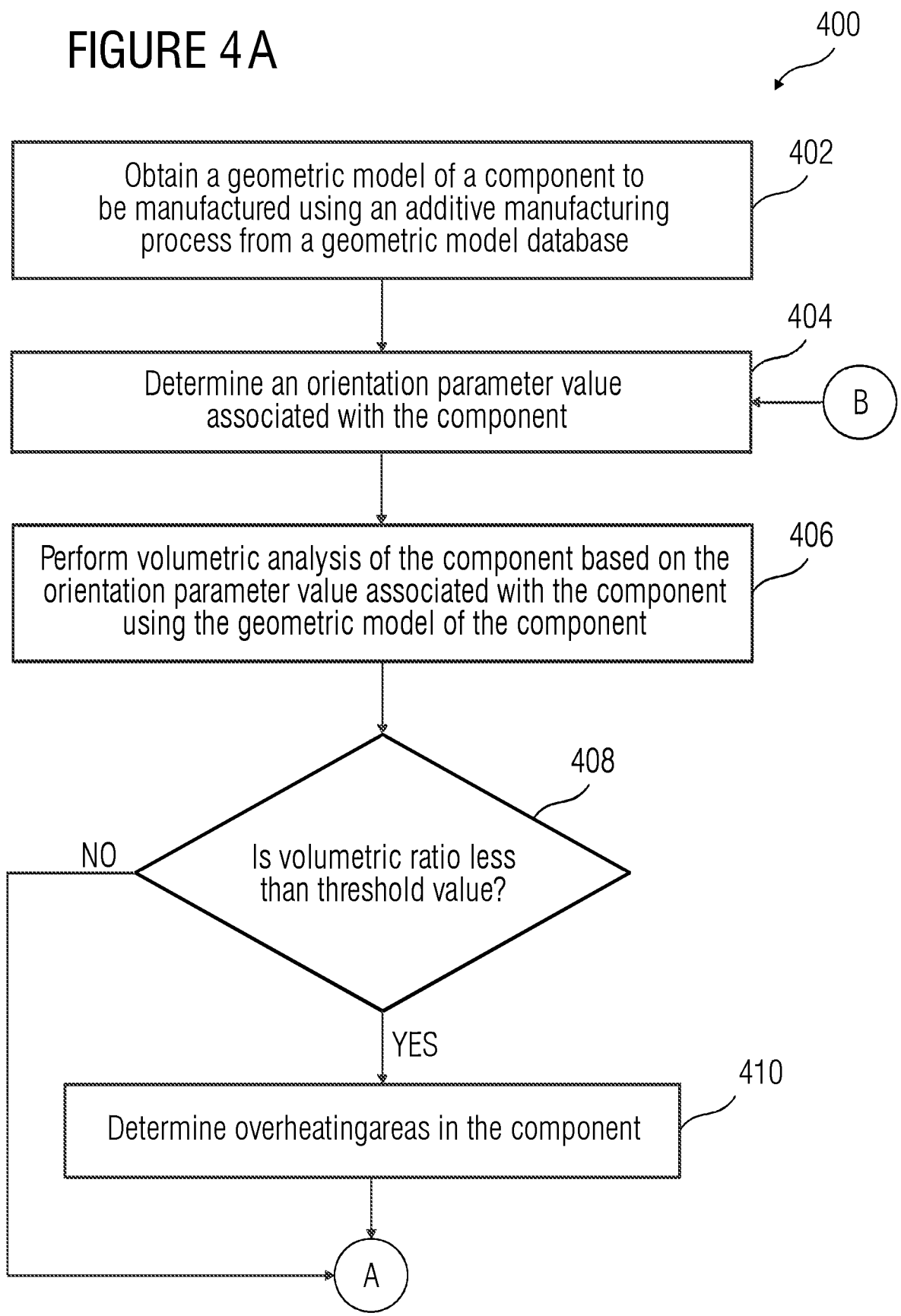

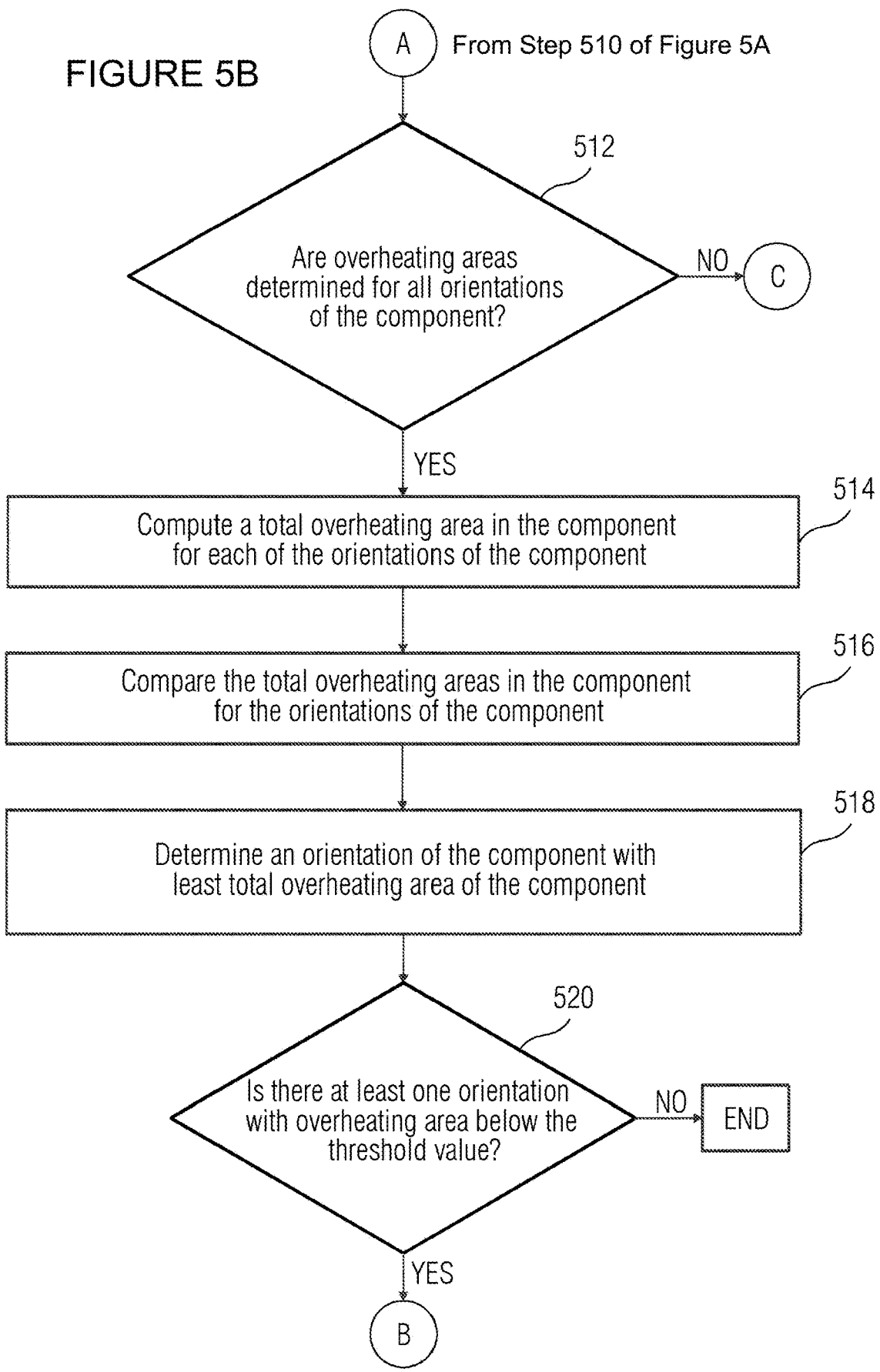

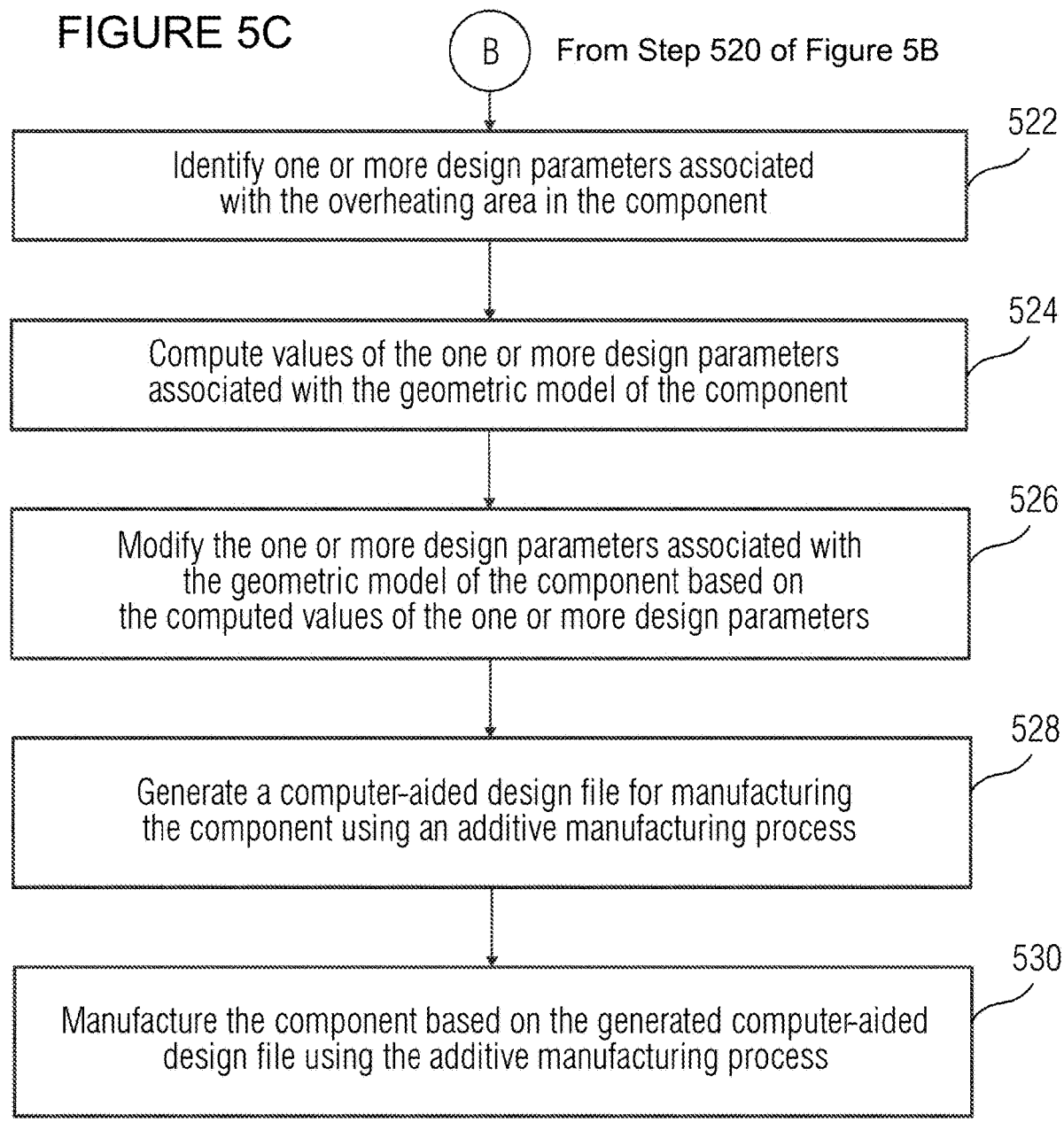

METHOD AND APPARATUS FOR DESIGNING AND MANUFACTURING A COMPONENT IN A COMPUTER-AIDED DESIGN AND MANUFACTURING ENVIRONMENT

This application is the National Stage of International Application No. PCT/US2020/044387, filed Jul. 31, 2020, which claims the benefit of Indian Patent Application No. IN 201931051841, filed Dec. 13, 2019. The entire contents of these documents are hereby incorporated herein by reference.

FIELD OF TECHNOLOGY

The present disclosure relates to the field of computer-aided design and manufacturing, and more particularly, to a method and apparatus for designing and manufacturing a component in a computer-aided design and manufacturing environment.

BACKGROUND

Generally, an additive manufacturing process begins with designing of a computer aided design (CAD) model (also referred to as geometric model) of a physical object (e.g., component of a machine) to be manufactured, which is numerically 'sliced' into several discrete layers. A file containing the geometric component is input to an additive manufacturing system. The additive manufacturing system manufactures the component based on the geometric model usually by successively adding material layer by layer.

Typically, components are manufactured using the additive manufacturing process such as powder bed fusion (PBF) using power bed printers. The components manufactured using the additive manufacturing process may be distorted due to overheating of the components during manufacturing, resulting in wastage or rejection of the components built using the additive manufacturing process. Overheating may be caused as heat may not be dissipated quickly. This occurs when ratio of powder material with respect to printed solid is above a certain threshold value.

SUMMARY

The scope of the present disclosure is defined solely by the appended claims and is not affected to any degree by the statements within this description. The present embodiments may obviate one or more of the drawbacks or limitations in the related art. A method and apparatus for designing and manufacturing a component in a computer-aided design and manufacturing environment is disclosed.

In one aspect, a method includes obtaining a geometric model of a component from a geometric model database, and determining at least one orientation parameter value associated with the component. The at least one orientation parameter value defines orientation of the component during additive manufacturing of the component. The method also includes performing volumetric analysis of the component based on the at least one orientation parameter value associated with the component using the geometric model of the component, computing one or more overheating areas in the component based on the volumetric analysis of the geometric model of the component, and generating a multi-dimensional visual representation of the geometric model of the component indicating one or more overheating areas in the component.

The method may include computing total overheating area in the component for each orientation of a plurality of orientations of the component. The method may include comparing total overheating area in the component for the plurality of orientations of the component, and determining an orientation of the plurality of orientations of the component with least total overheating area of the component.

The method may include generating a computer-aided design file for manufacturing the component using an additive manufacturing process. The computer-aided design file includes an orientation parameter value indicating orientation of the component with the least total overheating area in the component during the additive manufacturing process, and manufacturing the component based on the generated computer-aided design file using the additive manufacturing process.

Additionally, the method may include identifying one or more design parameters associated with the overheating areas in the component, and computing values of the one or more design parameters associated with the geometric model of the component. The method may also include modifying the one or more design parameters associated with the geometric model of the component based on the computed values of the one or more design parameters such that overheating in the component is below an overheating threshold value.

In the act of performing the volumetric analysis of the component based on the at least one orientation parameter value associated with the component, the method may include: determining an evaluation point on the geometric model of the component; computing a heating volume around the evaluation point on the geometric model of the component; computing an intersect volume which intersects a component volume and the heating volume around the evaluation point on the geometric model of the component; and computing a volumetric ratio of the intersect volume and the heating volume around the evaluation point.

In the act of computing the one or more overheating areas in the component corresponding to the at least one orientation parameter value based on the volumetric analysis of the geometric model of the component, the method may include determining whether the volumetric ratio of the intersect volume and the heating volume around the evaluation point is less than a threshold value, and determining the overheating area in the component around the evaluation point when the volumetric ratio of the intersect volume and the heating volume around the evaluation point is less than the threshold value.

In another aspect, an apparatus for designing and manufacturing a component in a computer-aided design and manufacturing environment includes a processing unit (e.g., processor), and a memory coupled to the processing unit. The memory includes a computer-aided design and manufacturing module stored in the form of instructions and executable by the processing unit. The computer-aided design and manufacturing module is configured to obtain a geometric model of a component from a geometric model database, and determine at least one orientation parameter value associated with component. The at least one orientation parameter value defines orientation of the component during additive manufacturing of the component. The computer-aided design and manufacturing module is further configured to perform volumetric analysis of the component based on the at least one orientation parameter value associated with the component using the geometric model of the component, compute one or more overheating areas in the component based on the volumetric analysis of the geometric model of the component, and generate a multi-dimensional visual representation of the geometric model of the component indicating one or more overheating areas in the component.

The computer-aided design and manufacturing module may configured compute total overheating area in the component for each orientation of a plurality of orientations of the component, compare total overheating area in the component for the plurality of orientations of the component, and determine an orientation of the component with least total overheating area of the component.

The computer-aided design and manufacturing module may be further configured to generate a computer-aided design file for manufacturing the component using an additive manufacturing process, and manufacture the component based on the generated computer-aided design file using the additive manufacturing process. The computer-aided design file includes an orientation parameter value indicating orientation of the component with the least total overheating area in the component during the additive manufacturing process.

The computer-aided design and manufacturing module may be further configured to identify one or more design parameters associated with the overheating areas in the component, compute values of the one or more design parameters associated with the geometric model of the component, and modify the one or more design parameters associated with the geometric model of the component based on the computed values of the one or more design parameters such that overheating in the component is below an overheating threshold value.

To perform the volumetric analysis of the component, the computer-aided design and manufacturing module may be configured to determine an evaluation point on the geometric model of the component, compute a heating volume around the evaluation point on the geometric model of the component, compute an intersect volume that intersects a component volume and the heating volume around the evaluation point on the geometric model of the component, and compute a volumetric ratio of the intersect volume and the heating volume around the evaluation point.

To compute the one or more overheating areas in the component, the computer-aided design and manufacturing module may be further configured to determine whether the volumetric ratio of the intersect volume and the heating volume around the evaluation point is less than a threshold value, and determine the overheating area in the component around the evaluation point when the volumetric ratio of the intersect volume and the heating volume around the evaluation point is less than the threshold value.

In yet another aspect, a non-transitory computer-readable storage medium, having machine-readable instructions stored therein that, when executed by a processing unit, cause the processing unit to perform above mentioned method acts, is provided.

This summary is provided to introduce a selection of concepts in a simplified form that are further described below in the following description. The summary is not intended to identify features or essential features of the claimed subject matter. The claimed subject matter is not limited to implementations that solve any or all disadvantages noted in any part of this disclosure.

BRIEF DESCRIPTION OF THE DRAWINGS

FIG. 3 is a process flowchart of an exemplary method of designing and manufacturing the component in a computer-aided design and manufacturing environment, according to one embodiment.

FIGS. 4A-4B show a process flowchart of an exemplary method of designing and manufacturing the component in a computer-aided design and manufacturing environment, according to another embodiment.

FIGS. 5A-5C show a process flowchart of an exemplary method of designing and manufacturing the component in a computer-aided design and manufacturing environment, according to yet another embodiment.

DETAILED DESCRIPTION

Figure 1:
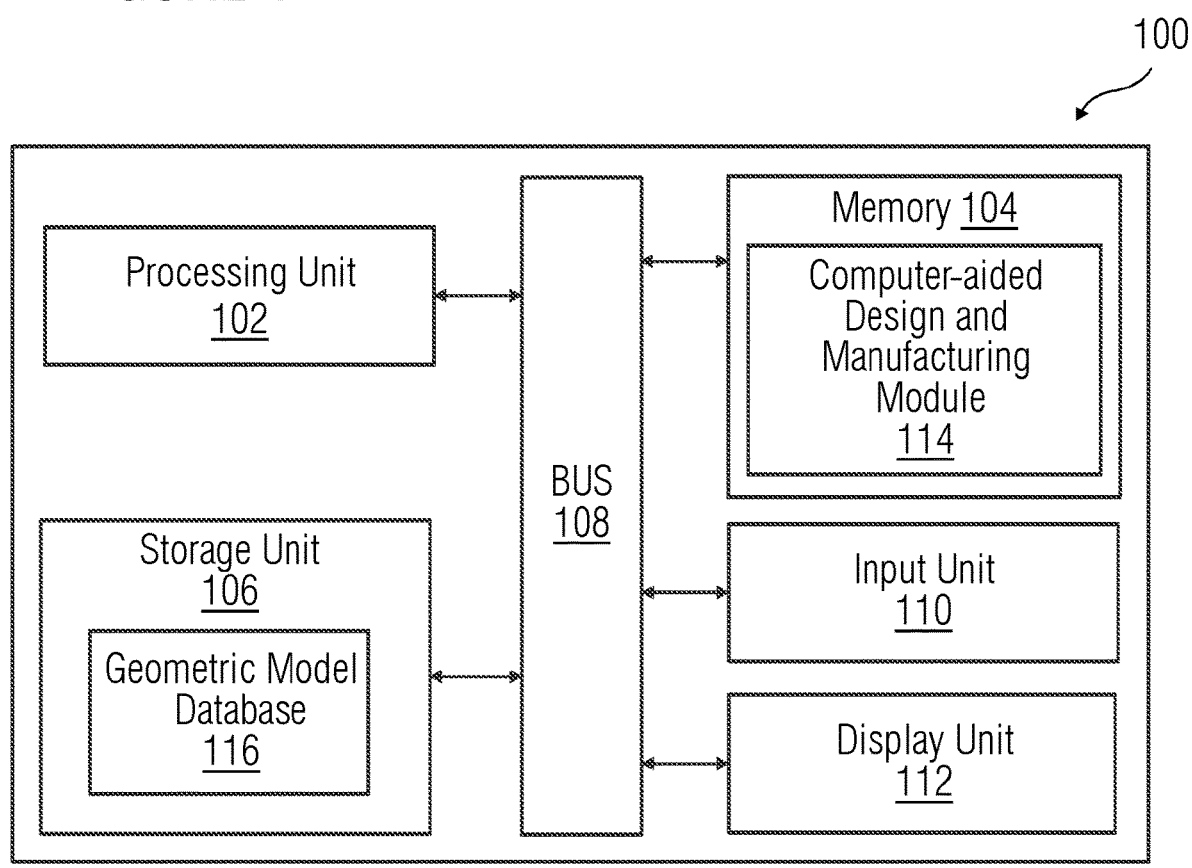
FIG. 1 is a block diagram of an exemplary data processing apparatus for designing and manufacturing a component, according to one embodiment.

A method and apparatus for designing and manufacturing a component in a computer-aided design and manufacturing environment is disclosed. Various embodiments are described with reference to the drawings, where like reference numerals are used in reference to the drawings. Like reference numerals are used to refer to like elements throughout. In the following description, numerous specific details are set forth in order to provide a thorough understanding of embodiments. These specific details need not be employed to practice embodiments. In other instances, well known materials or methods have not been described in detail in order to avoid unnecessarily obscuring embodiments. While the disclosure is susceptible to various modifications and alternative forms, specific embodiments thereof are shown by way of example in the drawings and will herein be described in detail. There is no intent to limit the disclosure to the particular forms disclosed. Instead, the disclosure is to cover all modifications, equivalents, and alternatives falling within the spirit and scope of the present disclosure.

FIG. 1 is a block diagram of an exemplary computer-aided design and manufacturing system 100 for designing and manufacturing a component using an additive manufacturing process, according to one embodiment. The computer-aided design and manufacturing system 100 may be a desktop computer, a laptop computer, a tablet, and the like. In FIG. 1, the computer-aided design and manufacturing system 100 includes a processing unit 102, a memory 104, a storage unit 106, a bus 108, an input unit 110, and a display unit 112.

The processing unit 102, as used herein, may be any type of computational circuit, such as, but not limited to, a microprocessor, microcontroller, complex instruction set computing microprocessor, reduced instruction set computing microprocessor, very long instruction word microprocessor, explicitly parallel instruction computing microprocessor, graphics processor, digital signal processor, or any other type of processing circuit. The processing unit 102 may also include embedded controllers, such as generic or programmable logic devices or arrays, application specific integrated circuits, single-chip computers, and the like.

The memory 104 may be non-transitory volatile memory and non-volatile memory. The memory 104 may be coupled for communication with the processing unit 102, such as being a computer-readable storage medium. The processing unit 102 may execute instructions and/or code stored in the memory 104. A variety of computer-readable instructions may be stored in and accessed from the memory 104. The memory 104 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 104 includes a computer-aided design and manufacturing module 114 stored in the form of machine-readable instructions on any of the above-mentioned storage media and may be in communication with and executed by the processing unit 102. When executed by the processing unit 102, the computer-aided design and manufacturing unit 114 causes the processing unit 102 to design and manufacture a component using an additive manufacturing process. Method acts performed by the processing unit 102 to achieve the above functionality are described in greater detail in FIGS. 3, 4, and 5.

The storage unit 106 may be a non-transitory storage medium that stores a geometric model database 116. The geometric model database 116 stores data files containing geometric model information associated with components to be manufactured using the additive manufacturing process. The geometric model database 116 also stores a computer-aided design file to facilitate manufacturing of the component using the additive manufacturing process. The input unit 110 may include input devices such as a keypad, a touch-sensitive display, a camera (e.g., a camera receiving gesture-based inputs), etc. capable of receiving input signals such as a data file including geometric model information associated with one or more components to be manufactured using additive manufacturing process. The display unit 112 may be a device with a graphical user interface displaying a multi-dimensional visual representation of the geometric model of the component indicating overheating areas for each orientations of the component. The graphical user interface may also enable users to input a search query for searching geometric model of components and/or computer-aided design files in the geometric model database 116. The bus 108 acts as interconnect between the processing unit 102, the memory 104, the storage unit 106, the input unit 110, and the display unit 112.

Those of ordinary skilled in the art will appreciate that the hardware depicted in FIG. 1 may vary for particular implementations. For example, other peripheral devices such as an optical disk drive and the like, a Local Area Network (LAN)/Wide Area Network (WAN)/Wireless (e.g., Wi-Fi) adapter, a graphics adapter, a disk controller, and/or an input/output (I/O) adapter may also be used in addition to or in place of the hardware depicted. The depicted example is provided for the purpose of explanation only and is not meant to imply architectural limitations with respect to the present disclosure.

A computer-aided design and manufacturing system in accordance with an embodiment of the present disclosure includes an operating system employing a graphical user interface. The operating system permits multiple display windows to be presented in the graphical user interface simultaneously with each display window providing an interface to a different application or to a different instance of the same application. A cursor in the graphical user interface play be manipulated by a user through the pointing device. The position of the cursor may be changed and/or an event such as clicking a mouse button may be generated to actuate a desired response.

One of various commercial operating systems, such as a version of Microsoft Windows™, a product of Microsoft Corporation located in Redmond, Washington, may be employed if suitably modified. The operating system is modified or created in accordance with the present disclosure as described.

Figure 2:
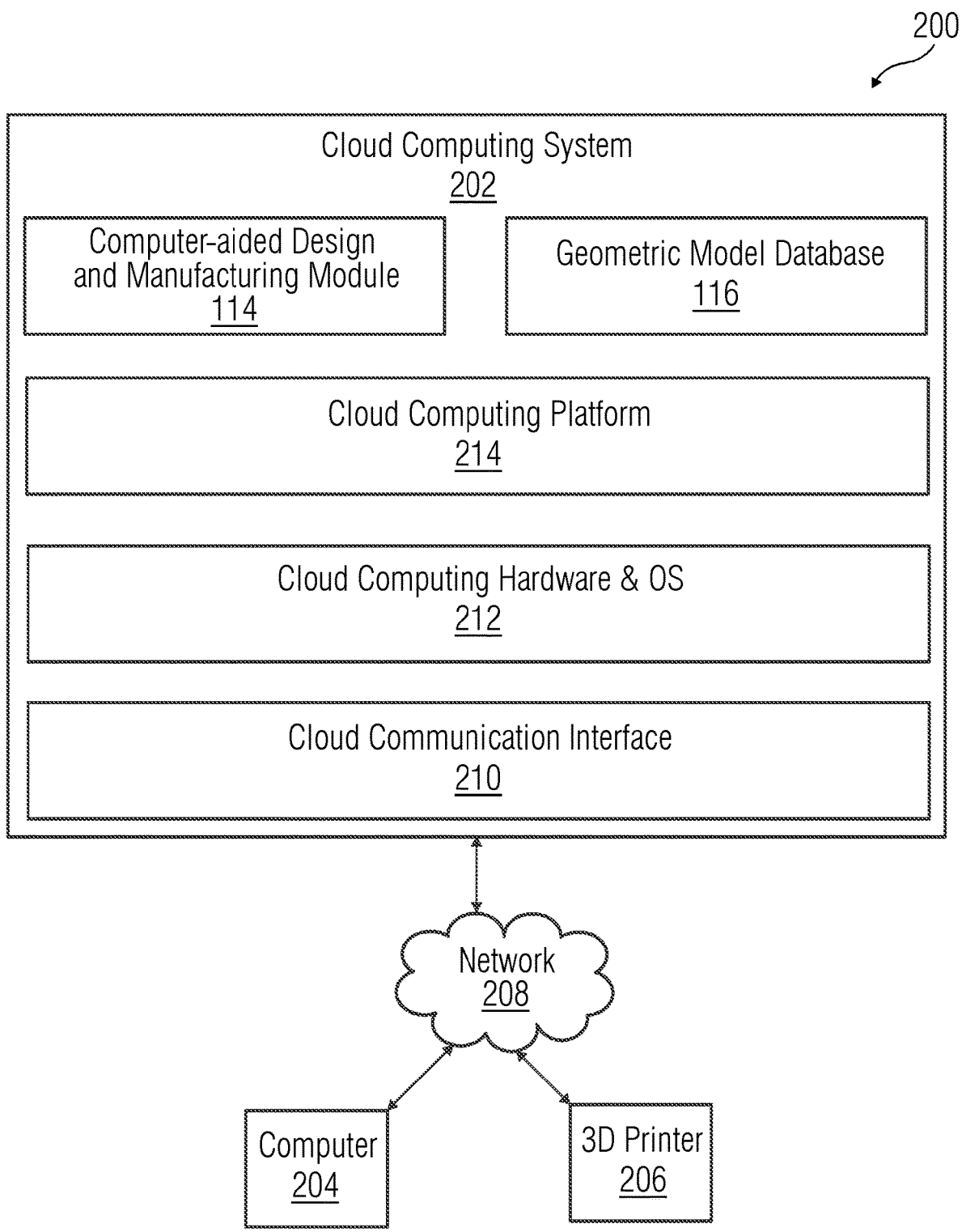
FIG. 2 is a schematic representation of a computer-aided design and manufacturing system designing and manufacturing a component, according to another embodiment.

FIG. 2 is a schematic representation of a computer-aided design and manufacturing system 200 for designing and manufacturing a component, according to another embodiment. For example, FIG. 2 depicts the cloud computing system 202 that is capable of providing cloud services for designing and manufacturing components using an additive manufacturing process. The cloud computing system 202 is connected to a computer 204 and a 3D printer 206 (e.g., power bed printer) via a network 208 (e.g., Internet).

The cloud computing system 202 includes a cloud communication interface 210, cloud computing hardware and OS 212, cloud computing platform 214, the computer-aided design and manufacturing module 114, and the geometric model database 116. The cloud communication interface 210 enables communication between the cloud computing platform 214, the computer 204, and the 3D printer. Also, the cloud communication interface 210 enables communication between the cloud computing platform 214 and one or more user devices such as a smart phone, a tablet, etc. (not shown).

The cloud computing hardware and OS 212 may include one or more servers on which an operating system is installed. The one or more servers include one or more processing units, one or more storage devices for storing data, and other peripherals required for providing cloud computing functionality. The cloud computing platform 214 is a platform that implements functionalities such as data storage, data analysis, data visualization, and/or data communication on the cloud hardware and OS 212 via APIs and algorithms, and delivers the aforementioned cloud services using cloud-based applications. The cloud computing platform 214 employs computer-aided design and manufacturing module 114 for designing and manufacturing component using additive manufacturing process as described in detail in FIGS. 3 to 5. The cloud computing platform 214 also includes the geometric model database 116 for storing geometric model of components and/or computer-aided design files for manufacturing the components using the additive manufacturing process. The cloud computing platform 214 may include a combination of dedicated hardware and software built on top of the cloud hardware and OS 212.

FIG. 3 is a process flowchart 300 of an exemplary method of designing and manufacturing a component in a computer-aided design and manufacturing environment, according to one embodiment. At act 302, a geometric model of a component to be manufactured using an additive manufacturing process is obtained from the geometric model database 116. For example, a geometric model may be a three-dimensional computer-aided design model. The component may be a single component such as a shaft or an assembly of parts. At act 304, an orientation parameter value associated with the component is determined. For example, an orientation parameter value defines orientation of the component during additive manufacturing of the component. For example, orientation parameter value may be an orientation angle.

At act 306, volumetric analysis of the component is performed based on the orientation parameter value associated with the component using the geometric model of the component. In an exemplary embodiment, an evaluation point on the geometric model of the component is determined. The evaluation point is determined by triangulating the surfaces/faces of the geometric model. In other words, triangles are created on each surface of the geometric model. The vertices of these triangles are used as the evaluation point. The resolution of triangulation may be finer or coarse. The resolution of triangulation determines a number of triangles created on each surface of the geometric model. A heating volume (e.g., half sphere) around the evaluation point on the geometric model of the component is computed. For example, a half sphere is constructed such that an opening of the half sphere lies in a build direction (e.g., vertical to a build plane) and is centered at the evaluation point. The half sphere represents a heating volume due to laser heat. The radius of the half sphere is computed based on laser power and material used to print the component.

At the time of printing the component at the evaluation point, the component that is printed would be below the plane at the evaluation point. Then, an intersect volume that intersects a component volume and the heating volume around the evaluation point on the geometric model of the component is computed. For example, the intersect volume is computed by intersecting the half sphere with the component volume that is already printed. Accordingly, a volumetric ratio of the intersect volume and the heating volume around the evaluation point is computed. For example, a ratio of the intersect volume and the volume of the half sphere is a volumetric ratio. In other words, the volumetric ratio is a ratio of a volume of sintered metal to a volume of metal pool.

At act 308, it is determined whether the volumetric ratio of the intersect volume and the heating volume around the evaluation point is less than a threshold value. If it is determined the volumetric ratio is less than the threshold value, then at act 310, the overheating area in the component around the evaluation point is determined. If it is determined the volumetric ratio is equal to or greater than the threshold value, then act 312 is performed. At act 312, a multi-dimensional visual representation of the geometric model of the component indicating one or more overheating areas in the component is generated. For example, the multi-dimensional visual representation of the geometric model may indicate overheating areas in the form of contour plots.

Figure 4B:
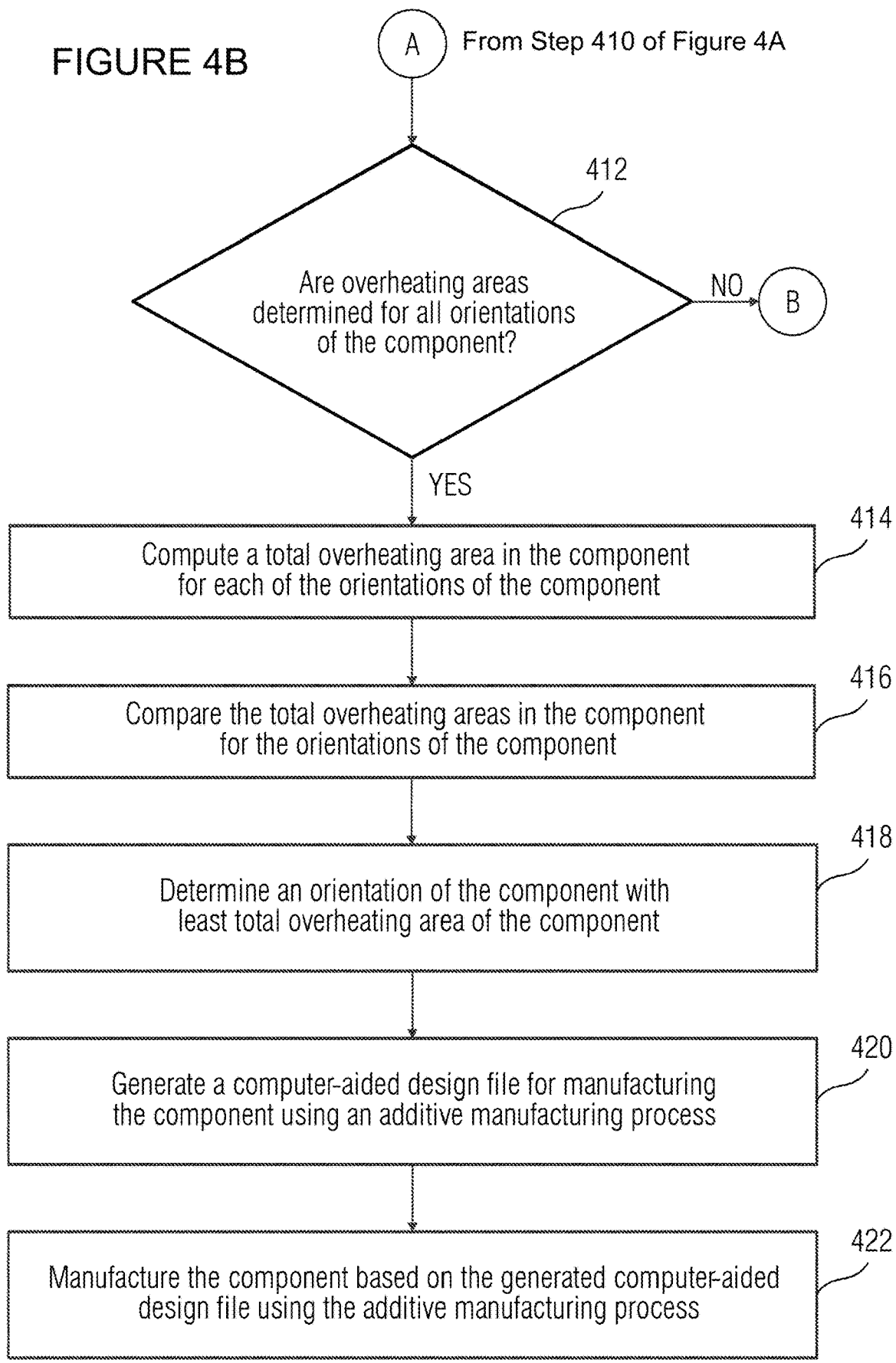

FIGS. 4A-4B show a process flowchart 400 of an exemplary method of designing and manufacturing a component in a computer-aided design and manufacturing environment, according to another embodiment. At act 402, a geometric model of a component to be manufactured using an additive manufacturing process is obtained from a geometric model database. For example, a geometric model may be a three-dimensional computer-aided design model. The component may be a single component such as a shaft or assembly of parts. At act 404, an orientation parameter value associated with the component is determined. For example, an orientation parameter value defines orientation of the component during additive manufacturing of the component. For example, the orientation parameter value may be an orientation angle.

At act 406, volumetric analysis of the component is performed based on the orientation parameter value associated with the component using the geometric model of the component. In an exemplary embodiment, an evaluation point on the geometric model of the component is determined. A heating volume around the evaluation point on the geometric model of the component is also computed. Then, an intersect volume that intersects a component volume and the heating volume around the evaluation point on the geometric model of the component is computed. Accordingly, a volumetric ratio of the intersect volume and the heating volume around the evaluation point is computed.

At act 408, it is determined whether the volumetric ratio of the intersect volume and the heating volume around the evaluation point is less than a threshold value. If it is determined the intersect volume around the evaluation point is less than the threshold value, then at act 410, the overheating area in the component around the evaluation point is determined. If it is determined the intersect volume around the evaluation point is equal to or greater than the threshold value, then act 412 is performed, At act 412, it is determined whether overheating areas are determined for all orientations of the component. If the overheating areas are determined for all orientations, then act 414 is performed. If any orientation is pending for determining overheating areas, the process 400 performs acts 404 to 412 until overheating areas for all orientations of the component are determined. At act 414, a total overheating area in the component for each of the orientations of the component is computed. At act 416, the total overheating areas in the component for the orientations of the component are compared. At act 418, an orientation of the component with a least total overheating area of the component is determined (e.g., based on the comparison in act 416).

At act 420, a computer-aided design file for manufacturing the component using an additive manufacturing process is generated. The computer-aided design file includes an orientation parameter value indicating orientation of the component with the least total overheating area in the component during the additive manufacturing process. At act 422, the component is manufactured based on the generated computer-aided design file using the additive manufacturing process.

Figure 5A:
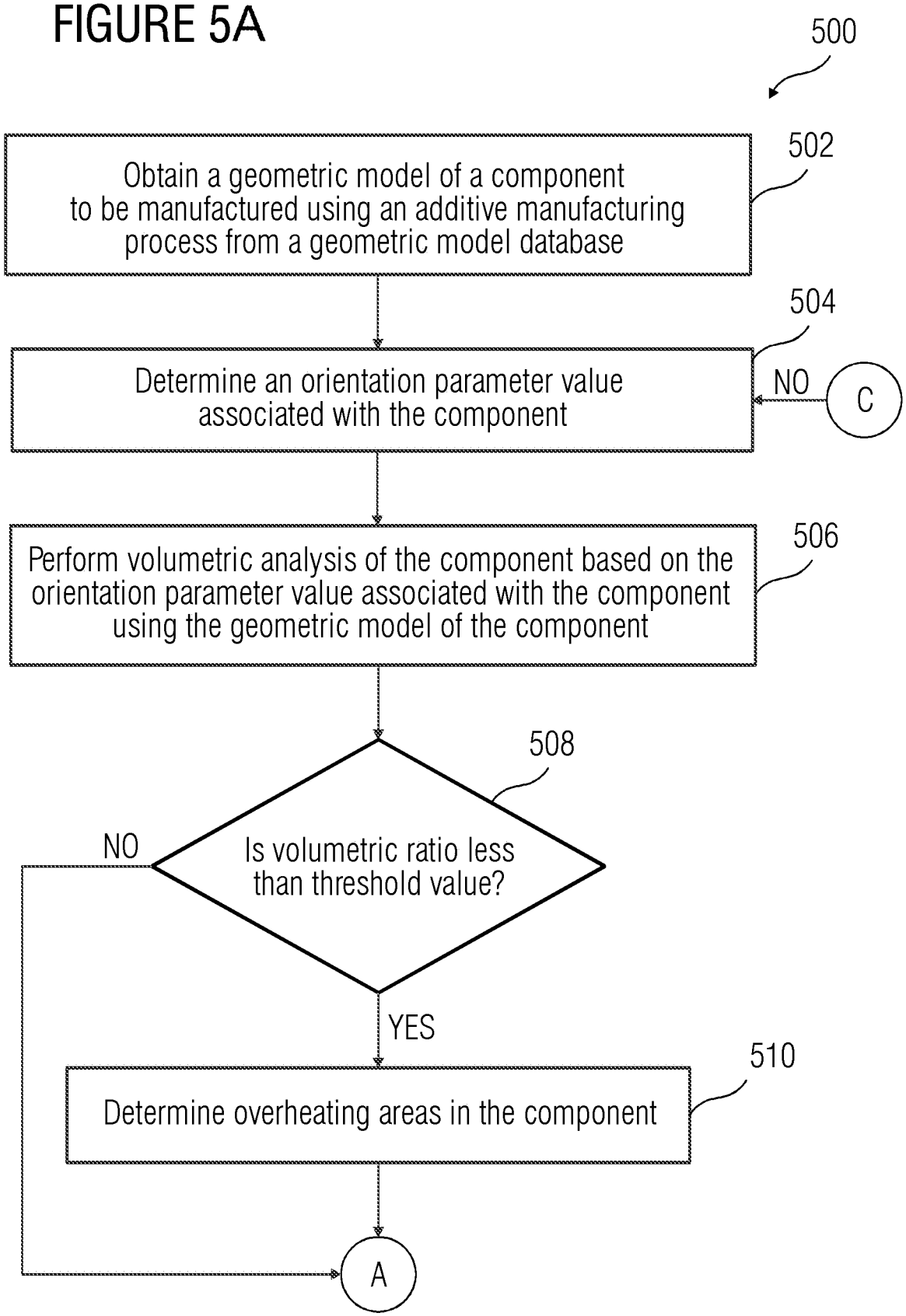

FIGS. 5A-5C show a process flowchart 500 of an exemplary method of designing and manufacturing a component in a computer-aided design and manufacturing environment, according to yet another embodiment. At act 502, a geometric model of a component to be manufactured using an additive manufacturing process is obtained from a geometric model database. For example, a geometric model may be a three-dimensional computer-aided design model. The component may be a single component such as a shaft or an assembly of parts. At act 504, an orientation parameter value associated with the component is determined. For example, an orientation parameter value defines orientation of the component during additive manufacturing of the component. For example, orientation parameter value may be an orientation angle.

At act 506, volumetric analysis of the component is performed based on the orientation parameter value associated with the component using the geometric model of the component. In an exemplary embodiment, an evaluation point an the geometric model of the component is determined. A heating volume around the evaluation point on the geometric model of the component is computed. Then, an intersect volume that intersects a component volume and the heating volume around the evaluation point on the geometric model of the component is computed. Accordingly, a volumetric ratio of the intersect volume and the heating volume around the evaluation point is computed.

At act 508, it is determined whether the volumetric ratio of the intersect volume and the heating volume around the evaluation point is less than a threshold value. If it is determined the volumetric ratio is less than the threshold value, then at act 510, the overheating area in the component around the evaluation point is determined. If it is determined the volumetric ratio is equal to or greater than the threshold value, then act 512 is performed.

At act 512, it is determined whether overheating areas are determined for all orientations of the component. If the overheating areas are determined for all orientations, then act 514 is performed. If any orientation is pending for determining overheating areas, the process 500 goes to act 504 and repeats acts 504 to 512 until overheating areas for all orientations of the component are determined. At act 514, a total overheating area in the component for each of the orientations of the component is computed. At act 516, the total overheating areas in the component for the orientations of the component are compared. At act 518, an orientation of the component with least total overheating area of the component is determined (e.g., based. on the comparison in act 516).

At act 520, it is determined whether there is at least one orientation with overheating area below the overheating threshold value. If there is at least one orientation with total overheating area below the overheating threshold value, then act 528 is perforated. If there is no orientation with total overheating area below the overheating threshold value, then at act 522, one or more design parameters associated with the overheating area in the component is identified. At act 524, values of the one or more design parameters associated with the geometric model of the component are computed. At act 526, the one or more design parameters associated with the geometric model of the component are modified based on the computed values of the one or more design parameters such that overheating in the component is below an overheating threshold value.

At act 528, a computer-aided design file for manufacturing the component using an additive manufacturing process is generated. The computer-aided design file includes an orientation parameter value indicating orientation of the component with the least total overheating area in the component during the additive manufacturing process. At act 530, the component is manufactured based on the generated computer-aided design file using the additive manufacturing process.

Figure 6A:
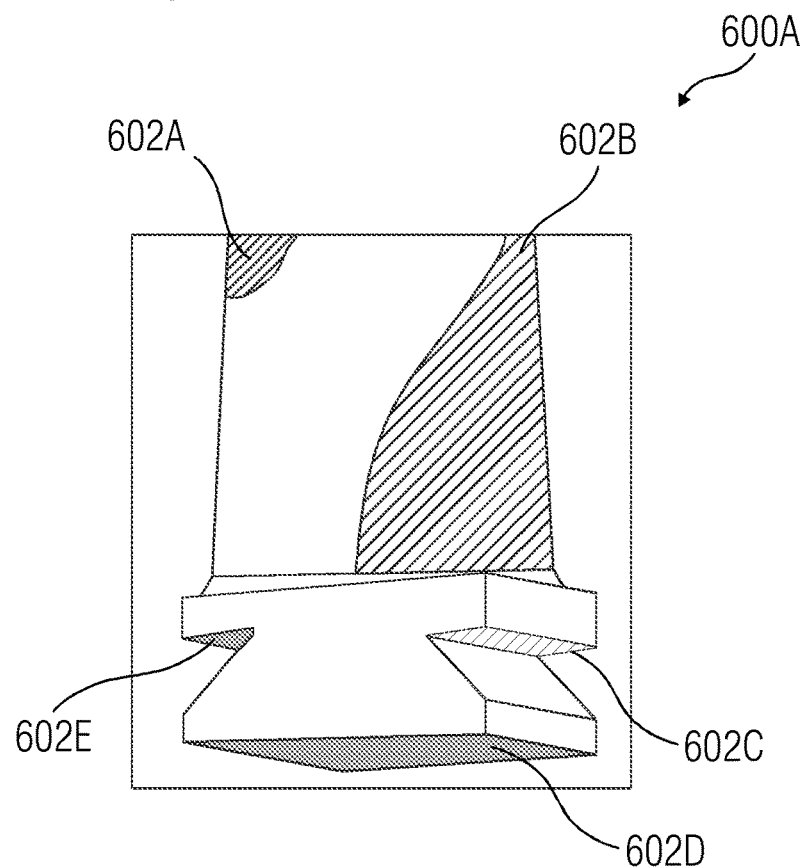
FIGS. 6A to 6C illustrate visual representations of a geometric model of a component indicating overheating areas in different orientations.
Figure 6B:
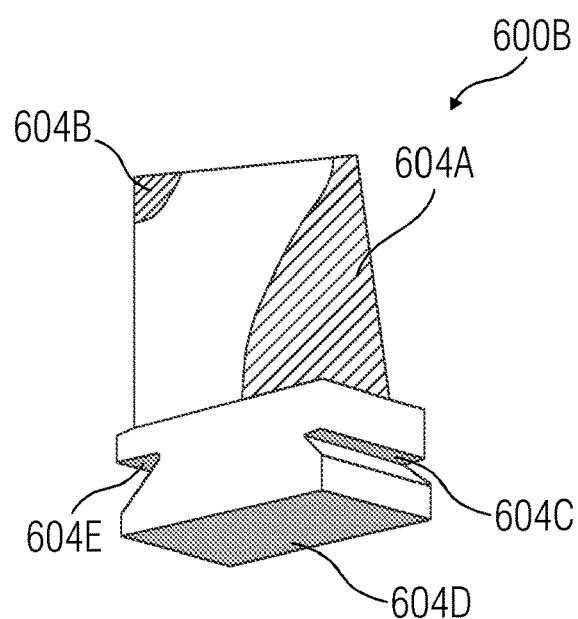
Figure 6C:
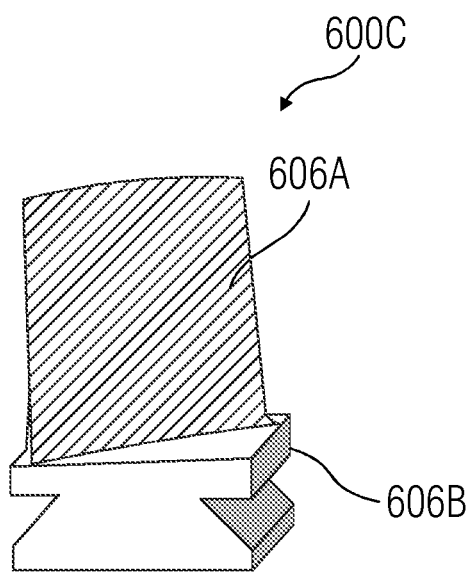

FIGS. 6A to 6C illustrate visual representations 600A-C of a geometric model of a component indicating overheating areas in different orientations. FIGS. 6A to 6C illustrate three-dimensional visual representations of a geometric model of a component. For example, FIGS. 6A to 6C depict overheating areas 602A-E. 604A-E, and 606A-B respectively, in different orientations of the component.

Figure 7:
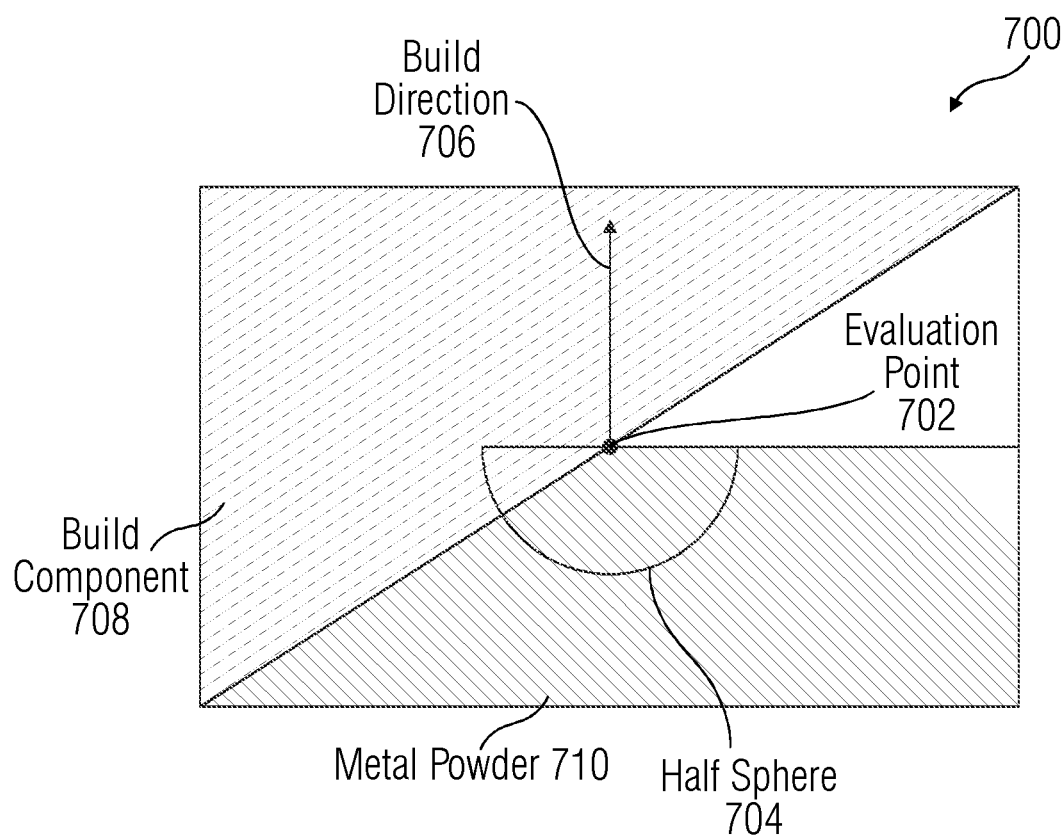
FIG. 7 is a schematic representation depicting computation of volumetric ratio for predicting overheating areas in a component, according to one embodiment.

FIG. 7 is a schematic representation 700 depicting computation of a volumetric ratio for predicting overheating areas in a component, according to one embodiment. As shown in FIG. 7, the schematic representation 700 depicts an evaluation point 702 that is obtained by tessellating a face of the component to be built using an additive manufacturing process (e.g., power bed fusion). The evaluation point 702 is determined for each face of the component for predicting overheating areas in the component during the additive manufacturing process. At the time of printing at the evaluation point 702, the evaluation point 702 separates a build component 708 from a metal powder bed. For each evaluation point 702, a half sphere 704 is constructed with an opening of the half sphere 704 in a build direction 706 (e.g., vertical to build plane). The half sphere 704 is centered around the evaluation point 702. The radius of the half sphere 704 is determined based on laser power and material used for printing the component. The half sphere 704 represents a heating volume due to laser heat. As shown in FIG. 7, a portion of the half sphere 704 intersects with the build component 708, and another portion of the half sphere 704 intersects with the metal powder bed 710. A volume (Volume$_{intersect}$) of the build component 708 that intersects with the halfsphere 704 is computed. Also, a volume (Volume$_{halfsphere}$) of the half sphere 704 is computed. Accordingly, a volumetric ratio of Volume$_{intersect}$ and Volume$_{halfsphere}$ is computed. If the volumetric ratio is below a pre-determined threshold value, then the evaluation point is considered as having a risk of overheating.

In accordance with the foregoing description, the data processing system 100 enables prediction of overheating areas in a component during an additive manufacturing process (e.g., power bed fusion) in different orientations using a volumetric ratio approach. The data processing system 100 is capable of predicting overheating areas even at the corners of the component. The data processing system 100 is capable of determining best orientation for the component having minimal overheating areas for printing the component. Also, the data processing system 100 modifies the design of the component such that overheating is minimized during printing of the component.

It is to be understood that the system and methods described herein may be implemented in various forms of hardware, software, firmware, special purpose processing units, or any combination thereof. One or more of the present embodiments may take a form of a computer program product including program modules accessible from computer-usable or computer-readable medium storing program code for use by or in connection with one or more computers, processing units, or instruction execution systems. For the purpose of this description, a computer-usable or computer-readable medium may be any apparatus that may contain, store, communicate, propagate, or transport the program for use by or in connection with the instruction execution system, apparatus, or device. The medium may be an electronic, magnetic, optical, electromagnetic, infrared, or semiconductor system (or apparatus or device), or propagation mediums in and of themselves as signal carriers are not included in the definition of physical computer-readable medium including a semiconductor or solid state memory, magnetic tape, a removable computer diskette, random access memory (RAM), a read only memory (ROM), a rigid magnetic disk, optical disk such as compact disk read-only memory (CD-ROM), compact disk read/write, and digital versatile disc (DVD), or any combination thereof. Both processing units and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

What is claimed is:

1. A method of designing and manufacturing a component in a computer-aided design and manufacturing environment, the method comprising:
   obtaining, by a processor, a geometric model of a component from a geometric model database;
   determining, by the processor, a plurality of orientation parameter values associated with the component, wherein the plurality of orientation parameter values defines a plurality of orientations of the component during additive manufacturing of the component;
   performing, by the processor, a volumetric analysis of the component based on the plurality of orientation parameter values associated with the component using the geometric model of the component, wherein the volumetric analysis comprises:
   determining an evaluation point on the geometric model of the component;
   computing a heating volume around the evaluation point on the geometric model of the component based on a laser power and a material used to print the component, wherein the heating volume is a half sphere centered at the evaluation point such that an opening of the half sphere lies in a build direction; p2 computing an intersect volume that intersects a component volume and the heating volume around the evaluation point on the geometric model of the component, wherein the component volume is a volume of the component already printed at a time of printing the component at the evaluation point; and
   computing a volumetric ratio of the intersect volume and the heating volume around the evaluation point;
   computing, by the processor, one or more overheating areas in the component based on whether the volumetric ratio determined in the volumetric analysis is less than a threshold;
   generating, by the processor, a multi-dimensional visual representation of the geometric model of the component indicating the one or more overheating areas in the component;
   computing, by the processor, a total overheating area in the component for each orientation of the plurality of orientations of the component;
   comparing, by the processor, the total overheating area in the component for the plurality of orientations of the component;
   determining, by the processor, an orientation of the plurality of orientations of the component with least total overheating area of the component based on the comparing;
   generating, by the processor, a computer-aided design file for manufacturing the component using an additive manufacturing process, wherein the computer-aided design file comprises an orientation parameter value of the plurality of orientation parameter values indicating the orientation of the component with the least total overheating area in the component during the additive manufacturing process; and
   manufacturing the component based on the generated computer-aided design file using the additive manufacturing process.

2. The method of claim 1, further comprising:
   identifying one or more design parameters associated with the one or more overheating areas in the component;
   computing values of the one or more design parameters associated with the geometric model of the component; and
   modifying the one or more design parameters associated with the geometric model of the component based on the computed values of the one or more design parameters such that overheating in the component is below an overheating threshold value.

3. The method of claim 1, wherein computing the one or more overheating areas in the component corresponding to the plurality of orientation parameter values based on the volumetric analysis of the geometric model of the component comprises:
   determining whether the volumetric ratio of the intersect volume and the heating volume around the evaluation point is less than the threshold value; and
   determining the overheating area in the component around the evaluation point when the volumetric ratio of the intersect volume and the heating volume around the evaluation point is less than the threshold value.

4. An apparatus for designing and manufacturing a component in a computer-aided design and manufacturing environment, the apparatus comprising:
   a processor; and
   a memory coupled to the processor, wherein the memory comprises a computer-aided design and manufacturing module stored in the form of instructions and executable by the processor, wherein the computer-aided design and manufacturing module is configured to:
   obtain a geometric model of a component from a geometric model database;
   determine a plurality of orientation parameter values associated with the component, wherein the plurality of orientation parameter values defines a plurality of orientations of the component during additive manufacturing of the component;
   perform a volumetric analysis of the component based on the plurality of orientation parameter values associated with the component using the geometric model of the component, wherein the volumetric analysis comprises:
   a determination of an evaluation point on the geometric model of the component;
   a computation of a heating volume around the evaluation point on the geometric model of the component based on a laser power and a material used to print the component, wherein the heating volume is a half sphere centered at the evaluation point such that an opening of the half sphere lies in a build direction;
   a computation of an intersect volume that intersects a component volume and the heating volume around the evaluation point on the geometric model of the component, wherein the component volume is a volume of the component already printed at a time of printing the component at the evaluation point; and
   a computation of a volumetric ratio of the intersect volume and the heating volume around the evaluation point;

compute one or more overheating areas in the component based on whether the volumetric ratio determined in the volumetric analysis is less than a threshold;

generate a multi-dimensional visual representation of the geometric model of the component indicating the one or more overheating areas in the component;

compute a total overheating area in the component for each orientation of the plurality of orientations of the component;

compare the total overheating area in the component for the plurality of orientations of the component;

determine an orientation of the plurality of orientations of the component with least total overheating area of the component based on the comparison;

generate a computer-aided design file for manufacturing the component using an additive manufacturing process, wherein the computer-aided design file comprises an orientation parameter value of the plurality of orientation parameter values indicating the orientation of the component with the least total overheating area in the component during the additive manufacturing process; and manufacture the component based on the generated computer-aided design file using the additive manufacturing process.

5. The apparatus of claim 4, wherein the computer-aided design and manufacturing module is further configured to:

identify one or more design parameters associated with the one or more overheating areas in the component;

compute values of the one or more design parameters associated with the geometric model of the component; and modify the one or more design parameters associated with the geometric model of the component based on the computed values of the one or more design parameters such that overheating in the component is below an overheating threshold value.

6. The apparatus of claim 4, wherein the computation of the one or more overheating areas in the component comprises the computer-aided design and manufacturing module being configured to:

determine whether the volumetric ratio of the intersect volume and the heating volume around the evaluation point is less than the threshold value; and determine the overheating area in the component around the evaluation point when the volumetric ratio of the intersect volume and the heating volume around the evaluation point is less than the threshold value.

7. A non-transitory computer-readable storage medium that stores machine-readable instructions executable by a processor to design and manufacture a component in a computer-aided design and manufacturing environment, the machine-readable instructions comprising:

obtaining a geometric model of a component from a geometric model database;

determining a plurality of orientation parameter values associated with the component, wherein the plurality of orientation parameter values defines a plurality of orientations of the component during additive manufacturing of the component;

performing a volumetric analysis of the component based on the plurality of orientation parameter values associated with the component using the geometric model of the component, wherein the volumetric analysis comprises:

determining an evaluation point on the geometric model of the component;

computing a heating volume around the evaluation point on the geometric model of the component based on a laser power and a material used to print the component, wherein the heating volume is a half sphere centered at the evaluation point such that an opening of the half sphere lies in a build direction;

computing an intersect volume that intersects a component volume and the heating volume around the evaluation point on the geometric model of the component, wherein the component volume is a volume of the component already printed at a time of printing the component at the evaluation point; and computing a volumetric ratio of the intersect volume and the heating volume around the evaluation point;

computing one or more overheating areas in the component based on whether the volumetric analysis of the geometric model of the component is less than a threshold;

generating a multi-dimensional visual representation of the geometric model of the component indicating the one or more overheating areas in the component;

computing a total overheating area in the component for each orientation of the plurality of orientations of the component;

comparing the total overheating area in the component for the plurality of orientations of the component;

determining an orientation of the plurality of orientations of the component with least total overheating area of the component based on the comparing;

generating a computer-aided design file for manufacturing the component using an additive manufacturing process, wherein the computer-aided design file comprises an orientation parameter value of the plurality of orientation parameter values indicating the orientation of the component with the least total overheating area in the component during the additive manufacturing process; and manufacturing the component based on the generated computer-aided design file using the additive manufacturing process.

8. The non-transitory computer-readable storage medium of claim 7, wherein the machine-readable instructions further comprise:

identifying one or more design parameters associated with the overheating areas in the component;

computing values of the one or more design parameters associated with the geometric model of the component; and modifying the one or more design parameters associated with the geometric model of the component based on the computed values of the one or more design parameters such that overheating in the component is below an overheating threshold value.

9. The non-transitory computer-readable storage medium of claim 7, wherein the machine-readable instructions further comprise:

determining whether the volumetric ratio of the intersect volume and the heating volume around the evaluation point is less than the threshold value; and determining the overheating area in the component around the evaluation point when the volumetric ratio of the intersect volume and the heating volume around the evaluation point is less than the threshold value.

* * * * *